United States Patent [19]

Sands

[11] 4,224,861

[45] Sep. 30, 1980

[54] VAULTS AND STRONGROOMS

[75] Inventor: Raymond L. Sands, Shirley, England

[73] Assignee: Chubb & Son's Lock and Safe Company, Limited, London, England

[21] Appl. No.: 8,023

[22] Filed: Jan. 31, 1979

[51] Int. Cl.[3] .............................................. B64D 13/00

[52] U.S. Cl. ...................................... 98/1.5; 109/1 V; 236/49

[58] Field of Search .............. 109/1 V; 98/1.5; 62/78; 236/49; 165/16

[56] References Cited

U.S. PATENT DOCUMENTS

| | | | |
|---|---|---|---|
| 1,786,277 | 12/1930 | West | 109/1 V |
| 1,805,332 | 5/1931 | Gross | 109/1 V |
| 2,500,775 | 3/1950 | Stewart | 165/16 |
| 2,545,194 | 3/1951 | Colburn et al. | 62/78 |
| 3,011,718 | 12/1961 | Joerren et al. | 236/49 |
| 3,165,147 | 1/1965 | Roof et al. | 236/49 |
| 3,401,619 | 9/1968 | Sotory | 98/1.5 |
| 3,509,810 | 5/1970 | Riester | 98/1.5 |
| 4,164,172 | 8/1979 | Anderten et al. | 165/16 |

FOREIGN PATENT DOCUMENTS

| | | |
|---|---|---|
| 396624 | 8/1933 | United Kingdom . |
| 403097 | 12/1933 | United Kingdom . |
| 544227 | 4/1942 | United Kingdom . |
| 1223950 | 3/1971 | United Kingdom . |

*Primary Examiner*—Henry C. Yuen
*Attorney, Agent, or Firm*—Pollock, Vande Sande & Priddy

[57] ABSTRACT

A vault or strongroom includes unitary and self-contained equipment for providing life-support within the sealed vault-enclosure. The carbon-dioxide content of the atmosphere within the enclosure is monitored and a pump is operated if the monitored value exceeds a predetermined value, typically 1% or 2%. Operation of the pump pumps air of the atmosphere through material that absorbs carbon dioxide and this, together with operation of a fan to circulate air in the enclosure is continued until the monitored content has been reduced, typically to 0.5%. Oxygen (or air) is released from cylinders for replacing the absorbed carbon dioxide and maintaining an oxygen level of about 18% or 19% in the enclosure. Release of oxygen is regulated by a valve device to maintain a variable—pressure (or oyxgen level)—of the atmosphere within the enclosure substantially constant or within predetermined limits. The pump is operated concurrently with release of the oxygen.

10 Claims, 1 Drawing Figure

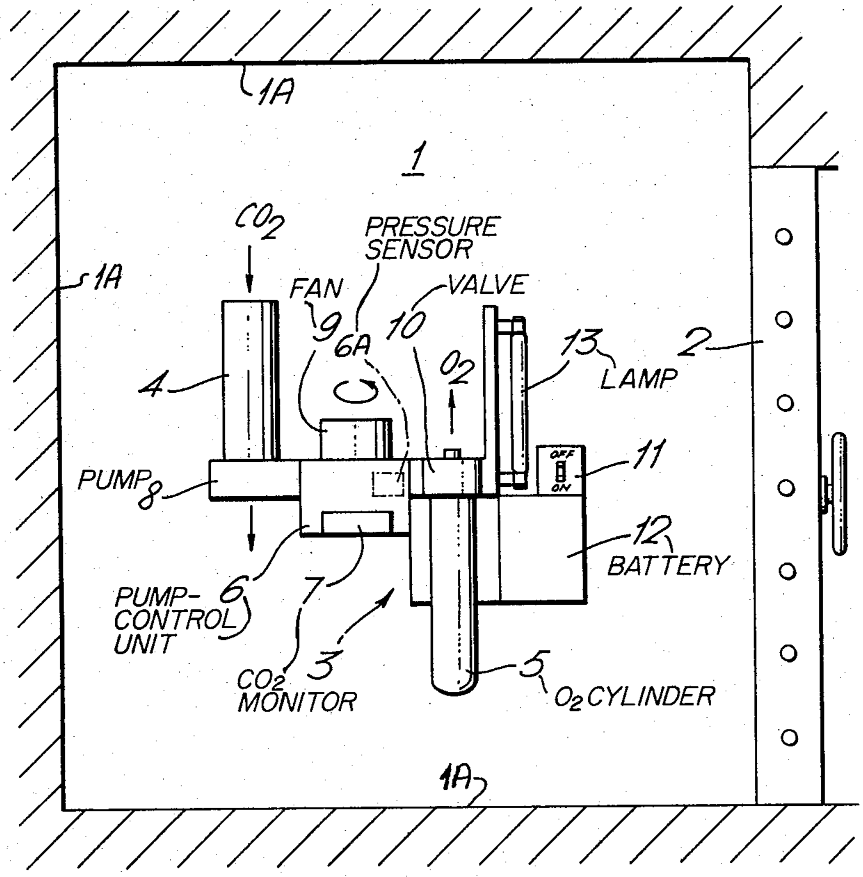
1A
1
$CO_2$
PRESSURE SENSOR
1A
FAN
VALVE
9
6A
10
$O_2$
13
LAMP
2
4
11
PUMP
8
12
BATTERY
PUMP-CONTROL UNIT
6
7
3
5
$CO_2$ MONITOR
$O_2$ CYLINDER
1A

VAULTS AND STRONGROOMS

This invention relates to vaults and strongrooms.

Banks and other institutions are commonly provided with a vault or strongroom—which terms are embraced collectively hereafter, and in the claims, by the term "vault" alone—for the safekeeping of money and other valuables. It has long been recognized that there is danger if one or more persons become locked within the vault, and in this respect it is not uncommon for ventilators or other devices to be provided through which air, and possibly also sustenance, may be passed to anybody trapped inside. However it must be recognized that the provision of ventilation or other access to the enclosure of the vault provides a potential avenue for attack on its physical security. In particular, ventilators may readily enable entry of explosives.

In order to provide maximum assurance of physical security of a vault and avoid compromising its integrity under attack, it is desirable that the enclosure be completely sealed. There is then the distinct danger that any person locked inside will suffocate before release comes or relief can be provided. The danger is intensified significantly where a time lock is used on the vault door, and although safety procedures can be adopted to minimize the likelihood of anybody being trapped accidentally, the danger cannot be entirely eliminated. In the latter respect furthermore, there is always the possibility that where a robbery is committed, staff or others may be locked in the vault in order to delay the raising of alarm and pursuit of the miscreants. If a large number of persons were forceably entrapped in this way, death could easily result unless release, or action to breach the door or wall to provide ventilation, is undertaken from the outside immediately, and is quickly achieved.

It is one of the objects of the present invention to make provision for life support within a vault that will enable the above-mentioned danger to be significantly reduced without compromising physical security. It is another of the objects of the present invention to provide a method for life support within a vault.

According to one aspect of the present invention there is provided in a vault, a monitor device for monitoring the carbon-dioxide content of the atmosphere within the enclosure of the vault, first means for responding to the condition in which the monitored content exceeds a predetermined value to remove carbon dioxide from said atmosphere, and second means for controlling admission of oxygen to the said enclosure and arranged such as to maintain another variable of said atmosphere substantially constant or at least within predetermined limits by virtue of such admission.

According to another aspect of the present invention there is provided a method of life support in a vault, comprising the steps of monitoring the carbon-dioxide content of the atmosphere within the enclosure of the vault, responding to the condition in which the monitored content exceeds a predetermined value to remove carbon dioxide from said atmosphere, and admitting oxygen to the said enclosure in a manner to maintain another variable of said atmosphere substantially constant, or at least within predetermined limits.

The controlled admission of oxygen to the said enclosure in accordance with either of the above aspects of the invention may be made in such a manner as to maintain the atmospheric pressure within the enclosure substantially constant or at least within predetermined limits. Some other variable of the atmosphere, for example oxygen content, may however be used as the criterion of admission instead of, or as well as, pressure.

The oxygen may be admitted to the enclosure alone or in combination with other gases—as air for example—from high-pressure cylinders. It may be released into the atmosphere within the said enclosure via one or more valves that are pre-set so that when opened the gas is admitted at a rate appropriate to replacement of the carbon dioxide removed.

The carbon dioxide may be removed by absorption, for example by passing air from the atmosphere within the enclosure through soda lime or lithium hydroxide. In this respect a pump may be arranged to be operated from the monitor device to pump the air through the absorption material in response to the condition in which the monitored carbon-dioxide content exceeds the said predetermined value. It may be arranged that operation of the pump accompanies oxygen release into the enclosure.

The monitor device and the said first and second means may be provided together with means for emergency illumination, as one unitary and self-contained piece of equipment within the vault.

A vault equipped in accordance with the present invention, together with a method of life support therein, will now be described, by way of example, with reference to the accompanying drawing. The drawing shows the vault and its incorporated life-support facilities in schematic form.

Referring to the drawing, the enclosure 1 of the vault, which is defined by solid impermeable walls 1A, is sealed air-tight by a door 2 and contains life-support equipment 3 of unitary and self-contained form. The equipment 3 incorporates one or more cylindrical vessels 4 that contain soda lime or other material for removal of carbon dioxide from the atmosphere of the enclosure 1 by absorption, together with one or more oxygen cylinders 5. A unit 6, which includes a device 7 for monitoring the carbon-dioxide content of the atmosphere, controls operation of a suction pump 8 for drawing air of the enclosure 1 through the one or more vessels 4. The device 7 may be a device of a known, commercially-available kind that periodically samples the atmosphere and compares two parts of each sample with one another after one of these parts has been passed through carbon-dioxide absorbing material.

The unit 6 responds to the condition in which the monitor device 7 detects that the carbon-dioxide content of the atmosphere has risen to a pre-set value, typically 1% or 2%, to operate the pump 8. A fan 9 is also operated from the unit 6 at this time to circulate air in the enclosure 1, and operation of both devices 8 and 9 is continued from the unit 6 for a predetermined interval of time or until the monitored carbon-dioxide content has been reduced to some predetermined lower value, typically 0.5%.

An electrically-operated valve-device 10 is provided for regulating admission of oxygen to the atmosphere of the enclosure 1 from the one or more cylinders 5. The valve device 10 is operated from the monitor unit 6 to release oxygen for replacing the absorbed carbon dioxide and maintaining a suitable oxygen level, for example, of about 18% or 19%, in the enclosure 1. More especially, the valve device 10 is operated to maintain a variable of the atmosphere other than the carbon-dioxide content as monitored by the monitor device 7, substantially constant at a pre-set, normal value, or alternatively to maintain it within some predetermined limits. This other variable may be ambient atmospheric pressure, and to this end the device 10 might be arranged to release oxygen at a rate dependent on atmospheric pressure as sensed within the enclosure 1 by a pressure-sensitive monitor device (indicated in broken line by box 6A) provided within the unit 6. On the other hand, the device 10 may be arranged to release oxygen at a rate that is regulated in accordance with the rate of carbon-dioxide absorption or, more simply, may be pre-set to release oxygen at a rate in accordance with the rate of carbon-dioxide absorption expected. The pump 8 is operated concurrently with the release of the oxygen; this is of advantage in that it ensures that there is carbon-dioxide removal even if the monitor device 7 fails.

The devices 7, 8, 9 and 10 are operated electrically via the unit 6, electrical supply being drawn via a switch 11 from a rechargeable battery 12 provided in the equipment 3. The switch 11 is mounted in a prominent position and is required to be switched from its normal OFF position to its ON position to activate the equipment 3 in its life-supporting function. Some clear indication of the location of the switch 11 and instruction for its operation are provided; in this respect continuous illumination of the switch 11 and an instruction panel (not shown) are provided in order to ensure that any trapped occupant can readily activate the equipment 3. One or more electrical lamps 13 powered from the battery 12 via the switch 11, provide more general illumination.

The equipment 3 may include facilities for enabling communication to be established to the outside of the vault, together with a tape player to provide prerecorded messages; such messages may be simply by way of reassurance or may be more general and include instructions for operation of the equipment and survival or other procedures.

Although the equipment 3 described incorporates one or more oxygen cylinders 5, these may be replaced by cylinders of compressed air. However use of oxygen is preferred, more especially because fewer cylinders are generally needed to meet any specific survival requirement. Such requirement might typically be for survival for 100 person-hours over and beyond that provided by the initial fresh-air atmosphere of the enclosure. This can normally be met using two small oxygen cylinders, whereas seven cylinders of comparable size would be required if compressed air were to be used.

The carbon-dioxide content of the atmosphere within the enclosure 1 is desirably maintained below 3% and the oxygen content substantially within the range of 17 to 19%.

I claim:

1. In a vault having impermeable walls defining an enclosure and a door to seal said enclosure air-tight, a monitor device communicating with the atmosphere within the sealed enclosure of the vault to monitor a first of two variables of said atmosphere, said first variable being the carbon-dioxide content of the atmosphere within said sealed enclosure, first means in said sealed enclosure coupled with said monitor device for responding to the condition in which the monitored carbon-dioxide content exceeds a predetermined value to remove carbon-dioxide from said atmosphere, and second means in said sealed enclosure for maintaining the second of said two variables of said atmosphere within predetermined limits, said second means including gas-storage means for supplying oxygen to said sealed enclosure by release from said gas-storage means, and means for regulating supply of said oxygen from said gas-storage means to said sealed enclosure to maintain the said second variable within said limits.

2. A vault according to claim 1, wherein said second variable is the atmospheric pressure within said enclosure, and said second means includes at least one pre-set valve that is operable to admit oxygen to said enclosure from said gas-storage means.

3. A vault according to claim 1, including means responsive to said supply of oxygen to said enclosure to operate said first means to remove carbon dioxide from said atmospheric concurrently with the said supply of oxygen to the enclosure.

4. A vault according to claim 1, including a fan operable to circulate air in the enclosure, and means for operating said fan during removal of carbon dioxide from said atmosphere by said first means.

5. In a vault, a monitor device communicating with the atmosphere within the enclosure of the vault to monitor a first of two variables of said atmosphere, said first variable being the carbon-dioxide content of the atmosphere within said enclosure, first means coupled with said monitor device for responding to the condition in which the monitored carbon-dioxide content exceeds a predetermined value to remove carbon-dioxide from said atmosphere, and second means for maintaining the second of said two variables of said atmosphere within predetermined limits, said second means including means for supplying oxygen to said enclosure, and means for regulating supply of said oxygen to said enclosure to maintain the said second variable within said limits, and said first means including material for absorbing carbon-dioxide, and a pump operable to pump air of the said atmosphere through the said material.

6. A vault according to claim 5, including means coupled to said monitor device and responsive to said condition to activate said pump to pump air of the said atmosphere through the said material, said pump-activating means being operative in response to each occurrence of said condition to continue to activate said pump until said monitored carbon-dioxide content has been reduced to a value substantially lower than said predetermined value.

7. A method of life support in a vault, comprising the steps of monitoring a first of two variables of the atmosphere within the enclosure of the vault, said first variable being the carbon-dioxide content of said atmosphere, responding to the condition in which the monitored carbon-dioxide content exceeds a predetermined value to remove carbon-dioxide from said atmosphere, said step of removing carbon-dioxide including passing air of said atmosphere through material for absorbing carbon-dioxide, introducing gas-storage means containing oxygen into the vault and admitting oxygen to the said enclosure by release of gas from said gas-storage means to maintain the second of said two variables within predetermined limits.

8. A method according to claim 7, wherein said second variable is the atmospheric pressure within the said enclosure.

9. A method according to claim 7, including the step of removing carbon dioxide from the said atmosphere concurrently with the said admission of oxygen.

10. A method according to claim 7, wherein the oxygen content of said atmosphere is maintained substantially within the range of 17 to 19%.

* * * * *